United States Patent Office 3,400,133
Patented Sept. 3, 1968

3,400,133
METHOD OF REARRANGING THIOETHERS TO THIONES
Sidney T. Webster, Nitro, and John J. D'Amico, Dunbar, W. Va., assignors to Monsanto Company, St. Louis, Mo., a corporation of Delaware
No Drawing. Filed Oct. 16, 1964, Ser. No. 404,516
6 Claims. (Cl. 260—305)

The invention relates to an improved method for preparing N-substituted heterocyclic systems from corresponding thioethers by rearrangement of the symmetrical thioethers. The invention also relates to 3-(2-benzothiazolyl)-2-benzothiazolineone. More particularly, it deals with the preparation of thiones having the Formula 1

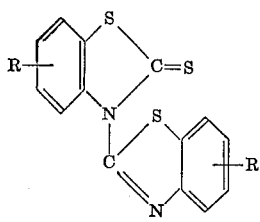

from the corresponding thioethers having the Formula 2

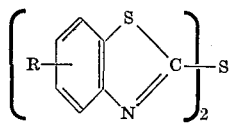

where R is hydrogen, Cl, $NO_2$, phenyl, lower alkoxy or lower alkyl where the alkyl is for example methyl, ethyl, propyl, isopropyl or amyl. It also deals with the preparatino of 3-(2-benzothiazolyl)-2-benzothiazolineone of the formula

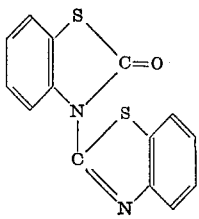

An object of the invention is to provide an improved method for the rearrangement of thioethers of Formula 2, supra, to the corresponding N-substituted thione compounds. Among the specific objects of the invention is a method for the preparation of a thione of the Formula 1, supra, where R is hydrogen, halogen, alkyl, alkoxy, phenyl or $NO_2$ and a method for the preparation of 3-(2-benzothiazolyl)-2-benzothiazolineone.

A further object of the invention is a method for the preparation of certain N-substituted thione compounds in high yields.

A further object of the invention is a method for the preparation of 3-(2-benzothiazolyl)-2-benzothiazolineone in a high yield.

There are several examples of thioethers rearranging. These rearrangements are attributed to either thermal or catalytic effect. For example, 2-benzyl thiobenzothiazole was obtained when benzyl chloride was reacted with 2-mercaptobenzothiazole. However, heating the same reactants at temperatures above 200° C. in the absence of alkali produced the N-substituted derivative. Elderfield in 5 Elderfield, Heterocyclic Compounds 556 (1957), suggested that the N-substituted benzyl derivative obtained under these conditions was a result of thermal rearrangement. It has also been reported that rearrangement of 2-alkylmercaptobenzothiazole to the N-substituted thione compound was accomplished by catalysis with halogens at high temperatures.

It was reported by Teppema, U.S. Patent 2,028,082, that 2,2'-thiobis(benzothiazole) could be converted into a higher melting isomer by heating to 150° C. or above. Investigation of this thermal rearrangement revealed that a mere 0.7% yield of rearranged product resulted. But we discovered that when a thioether was heated with a mercaptan or an alkali metal salt of a mercaptan, rearrangement of the thioether molecule to the corresponding thione was accomplished with relative ease. The sodium salt of the mercaptans was the preferred salt, however other salts may be used for example the potassium, ammonium, zinc, magnesium or lead salts. Also when a thione, for example 3 - (2-benzothiazolyl)-2-benzothiazolinethione, was treated with a mercaptan or a salt of a mercaptan at a high temperature a low percentage of the compound was rearranged to the corresponding thioether. Therefore, the rearrangement of a thioether to its corresponding thione was demonstrated to be reversible and an equilibrium reaction.

To illustrate rearrangement of a thioether with a mercaptan or a mercaptan salt, several methods were used to prepare 3 - (2 - benzothiazolyl)-2-benzothiazolinethione. For our first example, 30.04 grams (0.1 mole) 2,2'-thiobis-(benzothiazole) and 1.67 grams (0.01 mole) 2-mercaptobenzothiazole were stirred and heated at 225° C. ±5° in a 250 ml. 3-neck flash for 5 hours. The resulting product solidified on cooling. The product was stirred with a 25% sodium hydroxide solution to remove 2-mercaptobenzothiazole then collected and dried. Vapor phase chromatographic analysis of the product gave 75.6 weight percent 3 - (2-benzothiazolyl)-2-benzothiazolinethione and 24.4 weight percent of the starting material 2,2'-thiobis(benzothiazole). A sample of the resulting product melted at 115°–133° C. A 13.5 gram sample of the caustic-treated product was dissolved in 225 ml. of hot ethyl acetate and 7.0 grams of 3-(2-benzothiazolyl)-2-benzothiazolinethione, cream colored crystals, was recovered on cooling. A sample of this product melted at 144.5°–146.5° C. A mixture melting point of the recrystallized product with an authentic sample gave no depression. Nitrogen and sulfur analysis of this product gave 9.20% nitrogen and 31.85% sulfur. The calculated percentages for $C_{14}H_8N_2S_3$ are 9.33% nitrogen and 32.03% sulfur. Kinetic studies showed that an increase in molar ratio of 2-mercaptobenzothiazole increased the reaction rate.

Comparable results were obtained when the 2-mercaptobenzothiazole in the reaction, supra, was replaced with other mercaptans or salts thereof. Examples of these other mercaptans and their salts are 2-mercaptobenzoxazole or its salt, 2-mercaptobenzimidazole or its salt or 4-methyl-2-mercaptothiazole and 4,5-dimethyl-2-mercaptothiazole or their salts. However, when the same reaction was run with 2,2'-thiobis(benzothiazole) alone at 225° C. ±5°, a mere 11.5 weight percent thione isomer resulted according to vapor phase chromatographic analysis. Thus, yields of N-substituted thiones by rearrangement of thioethers were increased as much as 64% when a mercaptan or a salt of a mercaptan was heated with 2,2'-thiobis-(benzothiazole).

Catalyzed rearrangement takes place below 200° C., but temperatures above 150° C. are preferred. Temperatures of 225° C. ±5° gave the best results. Higher temperatures can be used but instability of the reactants caused some slight tar formation at about 250° C. Repeating the reaction in the first example, supra, except maintaining the temperature at 150° C. gave only 13.3 weight percent 3 - (2-benzothiazolyl)-2-benzothiazolinethione according to vapor phase chromatographic analysis. Vapor phase chromatographic analysis showed a mere 0.7 weight percent 3 - (2-benzothiazolyl)-2-benzothiazolinethione when the reaction was run with 2,2'-thiobis(benzothiazole) alone at 150° C. for 5 hours.

To further illustrate the rearrangement of a thioether, 24.5 grams (0.0663 mole) 2,2'-thiobis(5-chlorobenzothiazole) and 1.34 grams (.006 mole) 5 chloro-2-mercaptobenzothiazole were stirred and heated at 225° C. for 5 hours. The resulting product was a solid. Vapor phase chromatographic analysis of this product gave a high yield of 3-[2-(5-chlorobenzothiazolyl)]-2-(5-chlorobenzothiazolinethione). After two recrystallizations from dimethylformamide, a sample of the product melted at 286°–287° C. A mixture melting point of the product with an authentic sample gave no depression. Analysis gave 7.54% nitrogen, 25.95% sulfur and 19.47% chlorine as compared to 7.51% nitrogen, 26.05% sulfur and 19.20% chlorine calculated for $C_{14}H_6Cl_2N_2S_3$.

Another example of the operation of 3-(2-benzothiazolyl)-2-benzothiazolinethione was shown by stirring 30.04 grams (0.1 mole) 2,2'-thiobis(benzothiazole) and 1.89 (0.01 mole) parabromothiophenol in a 250 ml. flask at 225° C. ±5° for 5 hours. Vapor phase chromatographic analysis of the product from this reaction gave 73.6 weight percent 3-(2-benzothiazolyl)-2-benzothiazolinethione, 20.1 weight percent 2,2'-thiobis(benzothiazole) and 6.3 weight percent unidentified by-product. 3-(2-benzothiazolyl)-2-benzothiazolinethione was isolated from the product by recrystallizing with ethyl acetate then with an ethyl acetate-ethyl alcohol mixture. A sample of this product melted at 148.5°–149.5° C. Nitrogen and sulfur analysis gave 9.17% nitrogen and 32.18% sulfur as compared to 9.33% nitrogen and 32.03% sulfur calculated for $C_{14}H_8N_2S_3$. This reaction was repeated except the parabromothiophenol was replaced with one gram (0.004 mole) of iodine. Vapor phase chromatographic analysis gave only 27.4 weight percent 3-(2-benzothiazolyl)-2-benzothiazolinethione in this product.

We further discovered that when a thioether was heated with trifluoroacetic acid, concentrated sulfuric acid or toluenesulfonic acid, a rearrangement to the corresponding thione was accomplished and 3(2-benzothiazolyl-2-benzothiazolineone was also a product. To illustrate this part of my invention, a stirred mixture containing 30 grams (0.1 mole) of 2,2'-thiobis-(benzothiazole) and 1.14 grams (0.01 mole) of trifluoroacetic acid was heated at 225° to 230° C. for 5 hours. The hot reaction mixture was poured into a dish and allowed to stand overnight. The product, melting point 115°–123° C., obtained in quantitative yield, consisted of 69.8 weight percent 3-(2-benzothiazolyl)-2-benzothiazolinethione, 9.1 weight percent of product identified as 3-(2-benzothiazolyl)-2-benzothiazolineone and 21.1 weight percent 2,2'-thiobis(benzothiazole) according to vapor phase chromatographic analysis. A sample of 3-(2-benzothiazolyl)-2-benzothiazolinethione isolated by recrystallization from ethyl acetate melted at 138°–143° C. It melted at 147°–148° C. after a second recrystallization of a 6-gram sample from 300 ml. of ethyl alcohol and 50 ml. of ethyl acetate. A mixture melting point with an authentic sample did not depress the melting point and the infrared spectra of the two were superimposable. Analysis gave 9.0% nitrogen and 32.12% sulfur as compared to 9.33% nitrogen and 32.03% sulfur calculated for $C_{14}H_8N_2S_3$.

To illustrate the rearrangement whereby a higher proportion of 3-(2-benzothiazolyl)-2-benzothiazolineone forms, the trifluoroacetic acid of the reaction described, supra, was replaced with 1.027 grams (0.01 mole) 95.5% sulfuric acid. The product obtained in a quantitative yield contained 44.5 weight percent 3-(2-benzothiazolyl)-2-benzothiazolinethione, 32.6 weight percent 3-(2-benzothiazolyl)-2-benzothiazolineone and 22.9 weight percent 2,2'-thiobis(benzothiazole) according to the vapor phase chromatographic analysis.

Replacement of the trifluoroacetic acid of the reaction described, supra, with 1.9 grams (0.01 mole) of paratoluenesulfonic acid gave a quantitative yield of a product containing 44.1 weight percent 3-(-benzothiazolyl)-2-benzothiazolinethione, 39.7 weight percent 3-(2-benzothiazolyl)-2-benzothiazolineone and 16.2 weight percent 2,2'-thiobis(benzothiazole) according to vapor phase chromatographic analysis.

An attempt to rearrange 2,2'-thiobis(benzoxazole) to its corresponding thione demonstrated the uniqueness contributed by the sulfur in the ring of 2,2'-thiobis(benzothiazole). To illustrate this attempt, 17.5 grams (0.0651 mole) 2,2'-thiobis(benzoxazole) and 0.98 gram (0.00651 mole) 2-mercaptobenzoxazole were heated at 225° C. for 5 hours. The mixture was cooled. Vapor phase chromatographic analysis of this mixture showed that the mixture was unreacted starting material. Thus, rearrangement of 2,2'-thiobis(benzoxazole) to its corresponding N-substituted thione isomer was not accomplished.

It is intended to cover all modifications of examples chosen for purposes of disclosure which do not constitute departure from the spirit and scope of the invention.

We claim:

1. The method of rearranging a thioether having the formula

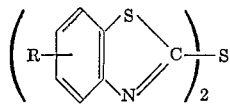

to a thione having the formula

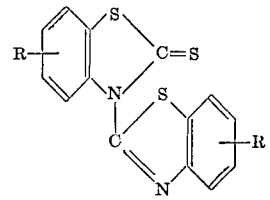

where R is selected from the group consisting of hydrogen, Cl, $NO_2$, phenyl, lower alkoxy and lower alkyl which comprises heating a composition consisting essentially of said thioether with a compound selected from the group consisting of mercaptans, salts of mercaptans, trifluoroacetic acid, paratoluene sulfonic acid, concentrated sulfuric acid and mixtures thereof.

2. The method of rearranging 2,2'-thiobis(benzothiazole) to 3-(2-benzothiazolyl)-2-benzothiazolinethione which comprises heating a compound consisting essentially of 2,2'-thiobis(benzothiazole) with 2-mercaptobenzothiazole at a temperature above 150° C.

3. The method of rearranging 2,2'-thiobis(benzothiazole) to 3-(2-benzothiazolyl)-2-benzothiazolinethione which comprises heating a compound consisting essentially of 2,2'-thiobis(benzothiazole) with sodium-2-mercaptobenzothiazole at a temperature above 150° C.

4. The method of rearranging 2,2'-thiobis(5-chlorobenzothiazole) to 3-[2-(5-chlorobenzothiazolyl)]-2-(5-chlorobenzothiazolinethione) which comprises heating a compound consisting essentially of 2,2'-thiobis(5-chlorobenzothiazole) with 5-chloro-2-mercaptobenzothiazole at a temperature above 150° C.

5. The method of rearranging 2,2'-thiobis(benzothiazole) to 3-(2-benzothiazolyl)-2-benzothiazolinethione which comprises heating the 2,2'-thiobis(benzothiazole) with parabromothiophenol at a temperature above 150° C.

6. The method of rearranging 2,2'-thiobis(benzothiazole) to 3-(2-benzothiazolyl)-2-benzothiazolinethione which comprises heating the 2,2'-thiobis(benzothiazole) with trifluoroacetic acid at a temperature above 150° C.

References Cited

Tsurugi et al.: Kogyo Kagaku Zasshi, vol. 60, pp. 362–365 (1957).

ALTON D. ROLLINS, *Primary Examiner.*